US011486452B2

(12) United States Patent
     Nakajo (10) Patent No.: US 11,486,452 B2
(45) Date of Patent: Nov. 1, 2022

(54) TRANSMISSION DEVICE (71) Applicant: UNIVANCE CORPORATION, Kosai (JP)

(72) Inventor: Yasumasa Nakajo, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 0 days.

(21) Appl. No.: 17/427,253

(22) PCT Filed: Feb. 1, 2019

(86) PCT No.: PCT/JP2019/003627
    § 371 (c)(1),
    (2) Date: Jul. 30, 2021

(87) PCT Pub. No.: WO2020/157957
    PCT Pub. Date: Aug. 6, 2020

(65) Prior Publication Data
    US 2022/0120323 A1    Apr. 21, 2022

(51) Int. Cl.
    *F16D 23/12*    (2006.01)
    *F16H 25/14*    (2006.01)
(52) U.S. Cl.
    CPC ............. *F16D 23/12* (2013.01); *F16H 25/14* (2013.01); *F16D 2023/123* (2013.01)
(58) Field of Classification Search
    CPC ..... F16D 2023/123; F16D 23/12; F16D 25/14
    See application file for complete search history.

(56) References Cited

U.S. PATENT DOCUMENTS 6,561,939 B1 *   5/2003   Knapke ................... F16H 48/34
                                              192/84.6
6,595,339 B1 *   7/2003   Bauknecht .......... F16H 63/3026
                                              192/48.618
(Continued)

FOREIGN PATENT DOCUMENTS

CN    203500271 U    3/2014
DE    102 51 467 A1  5/2003
(Continued)

OTHER PUBLICATIONS

Machine translation of DE-102015224801-A1 (Year: 2022).*
(Continued)

*Primary Examiner* — Stacey A Fluhart
(74) *Attorney, Agent, or Firm* — WHDA, LLP (57)    ABSTRACT

A transmission device includes: a shaft member, in the outer circumferential surface of which is formed a male thread centered about a second axis perpendicular to a first axis of a friction clutch; a screw member has a female thread that meshes with the male thread; an arm reciprocates together with the screw member; a first cam member couples to the arm to regulate the rotation of the screw member and rotates around the first axis; a second cam member has a cam surface that is oriented in the direction of the first axis to oppose a cam surface of the first cam member; and a rolling member is disposed between the two cam surfaces to roll on the two cam surfaces; the first cam member or the second cam member subjects the friction clutch to a force oriented in the direction of the first axis.

8 Claims, 8 Drawing Sheets

(56) References Cited

U.S. PATENT DOCUMENTS

| | | | | |
|---|---|---|---|---|
| 6,966,863 B2* | 11/2005 | Teraoka | ............... | H02K 7/108 |
| | | | | 475/154 |
| 2006/0011441 A1* | 1/2006 | Showalter | ............. | B60K 17/35 |
| | | | | 192/93 A |
| 2014/0371020 A1* | 12/2014 | Cooper | ................. | F16D 13/52 |
| | | | | 475/220 |

FOREIGN PATENT DOCUMENTS

| DE | 102015224801 A1 * | 6/2017 |
|---|---|---|
| JP | 3-4055 A | 1/1991 |
| JP | 2003-184993 A | 7/2003 |
| JP | 2008-2640 A | 1/2008 |

OTHER PUBLICATIONS

International Search Report dated Mar. 26, 2019, issued in counterpart International Application No. PCT/JP2019/003627 (1 page).

* cited by examiner

TRANSMISSION DEVICE

TECHNICAL FIELD

The present invention relates to a transmission device that converts rotary motion to linear motion.

BACKGROUND ART

Disclosed in Patent Literature 1 is a transmission device for converting rotary motion to linear motion. This transmission device is configured such that a fan-shaped member and a pressure plate are disposed coaxially with a friction clutch, and that a driven gear is formed on a circular portion of the fan-shaped member. A drive gear meshing with the driven gear is rotated by an electric motor in such a manner that a cam converts rotary motion of the fan-shaped member to axial linear motion of the pressure plate and thus engages the friction clutch.

CITATION LIST

Patent Literature

Patent Literature 1: Japanese Patent Application Laid-Open No. Hei 3 (1991)-4055

SUMMARY OF INVENTION

Technical Problem

However, the above conventional technology has a problem where the transmission device increases in size due to a wide range of movement of the fan-shaped member. Further, decreasing the radius of the fan-shaped member to reduce the size (diameter) of the transmission device makes it necessary to use an electric motor having a large driving force in order to rotate the fan-shaped member.

The present invention has been made to solve the above problem, and has an object to provide a transmission device that is small in size and capable of reducing the driving force required of an electric motor.

Solution to Problem

In order to accomplish the above object, according to a aspect of the present invention, there is provided a transmission device that engages a friction clutch by subjecting the friction clutch to a force oriented in the direction of a first axis. The transmission device includes a shaft member, a screw member, an arm, a first cam member, a second cam member, and a rolling member. The shaft member has a male thread, and rotates around a second axis. The second axis is perpendicular to the first axis. The male thread is formed on the outer circumferential surface of the shaft member and centered on the second axis. The screw member has a female thread that meshes with the male thread. The arm reciprocates together with the screw member. The first cam member couples to the arm to regulate the rotation of the screw member around the second axis, and rotates around the first axis. The second cam member has a cam surface that is oriented in the direction of the first axis to oppose a cam surface of the first cam member. The rolling member is disposed between the two cam surfaces to roll on the two cam surfaces. The first cam member or the second cam member subjects the friction clutch to a force oriented in the direction of the first axis.

Advantageous Effects of Invention

The transmission device according to a first aspect of the present invention is configured such that the female thread of the screw member meshes with the male thread of the shaft member, which rotates around the second axis perpendicular to the first axis of the friction clutch. The arm reciprocating together with the screw member couples to the first cam member, which rotates around the first axis, and regulates the rotation of the screw member around the second axis. Therefore, allowing the shaft member to make one rotation moves the screw member along the second axis by the amount of lead of screw thread. As the first cam member can be rotated by moving the screw member depending on the lead angle of screw thread, it is possible to reduce the size of the transmission. Further, it is also possible to reduce the driving force required of an electric motor used for rotating the shaft member.

The transmission device according to a second aspect of the present invention is configured such that second sections of the arm come into contact with first sections of the screw member to regulate the rotation of the screw member. When the shaft member rotates, the contact position between the second sections and the first sections moves on a virtual plane that passes through the contact position and the first axis. A first gap that the contact position passes through is disposed between the screw member and the arm. Consequently, in addition to the advantageous effects provided by the first aspect, it is possible to easily convert the linear motion of the screw member along the second axis to the rotary motion of the arm around the first axis.

The transmission device according to a third aspect of the present invention is configured such that the second cam member is controlled to regulate its rotary motion around the first axis and linear motion along the first axis, and that the first cam member subjects the friction clutch to a force oriented in the direction of the first axis. Second gaps oriented in the direction of the first axis are disposed between the screw member and the arm. Allowing the first cam member to subject the friction clutch to the force oriented in the direction of the first axis reduces a second gap that is positioned far from the friction clutch. Consequently, in addition to the advantageous effects provided by the first or second aspect, it is possible to certainly convert the rotary motion of the first cam member around the first axis to the linear motion of the first cam member along the first axis.

The transmission device according to a fourth aspect of the present invention is configured such that the screw member regulates the rotation of the shaft member by using friction between the male thread and the female thread when the first cam member receives, from the friction clutch, a reaction force oriented in the direction of rotation around the first axis. Therefore, the screw member can be stopped without continuously driving the electric motor used for rotating the shaft member. Consequently, in addition to the advantageous effects provided by one of the first to third aspects, it is possible to reduce the amount of energy consumption required for driving the electric motor.

DESCRIPTION OF EMBODIMENTS

Figure 1:
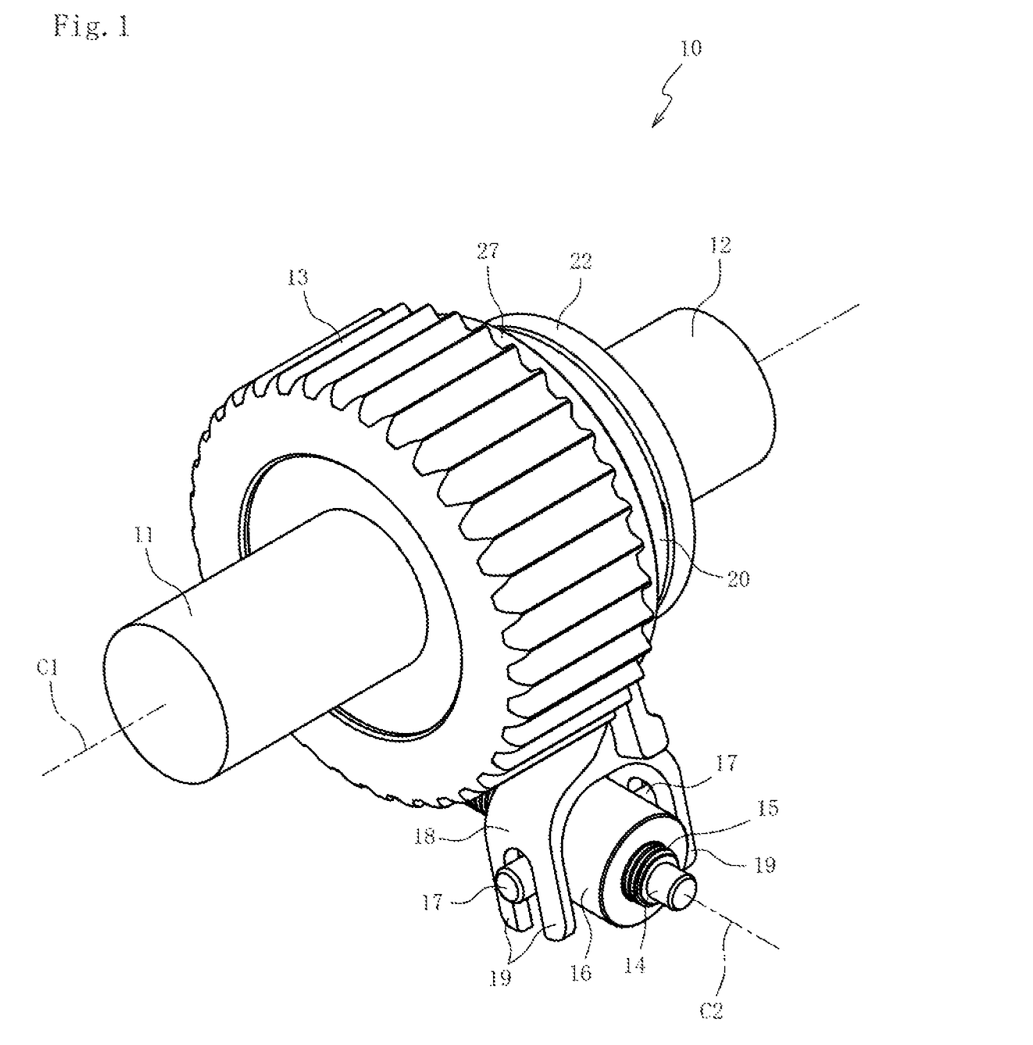
FIG. 1 is a perspective view illustrating a transmission device according to a first embodiment of the present invention.

Preferred embodiments of the present invention will now be described with reference to the accompanying drawings. First of all, a configuration of a transmission device 10 according to a first embodiment of the present invention will be outlined with reference to FIG. 1. FIG. 1 is a perspective view illustrating the transmission device 10 according to the first embodiment. The transmission device 10 is a device for engaging a friction clutch 13 that is disposed between a drive shaft 11 and a driven shaft 12. The friction clutch 13 performs power transmission and interruption between the drive shaft 11 and the driven shaft 12, which are disposed on a first axis C1.

The friction clutch 13 in the present embodiment is a disc clutch, or more specifically, a multiplate wet clutch that includes a drum, a hub (not depicted), and clutch plates (not depicted). The drum couples to the drive shaft 11. The hub couples to the driven shaft 12. The clutch plates are disposed between the hub and the drum. The clutch plates are supported by the drum and the hub so as to be able to move on the first axis C1. A pressure plate 27 adjusts a fastening force that is exerted between the hub and the drum by the clutch plates. The pressure plate 27 is pressed in the direction of power interruption by a spring (not depicted) disposed between the hub and the pressure plate 27. The spring and the transmission device 10 cause the pressure plate 27 to reciprocate on the first axis C1.

The transmission device 10 includes a shaft member 14, a screw member 16, an arm 18, a first cam member 20, and a second cam member 22. The shaft member 14 is disposed on a second axis C2 that is perpendicular to the first axis C1. The screw member 16 meshes with a male thread 15 that is formed on the outer circumferential surface of the shaft member 14. The arm 18 is related to the screw member 16. The first cam member 20 couples to the arm 18 and rotates around the first axis C1. The second cam member 22 is disposed on the first axis C1.

Figure 2:
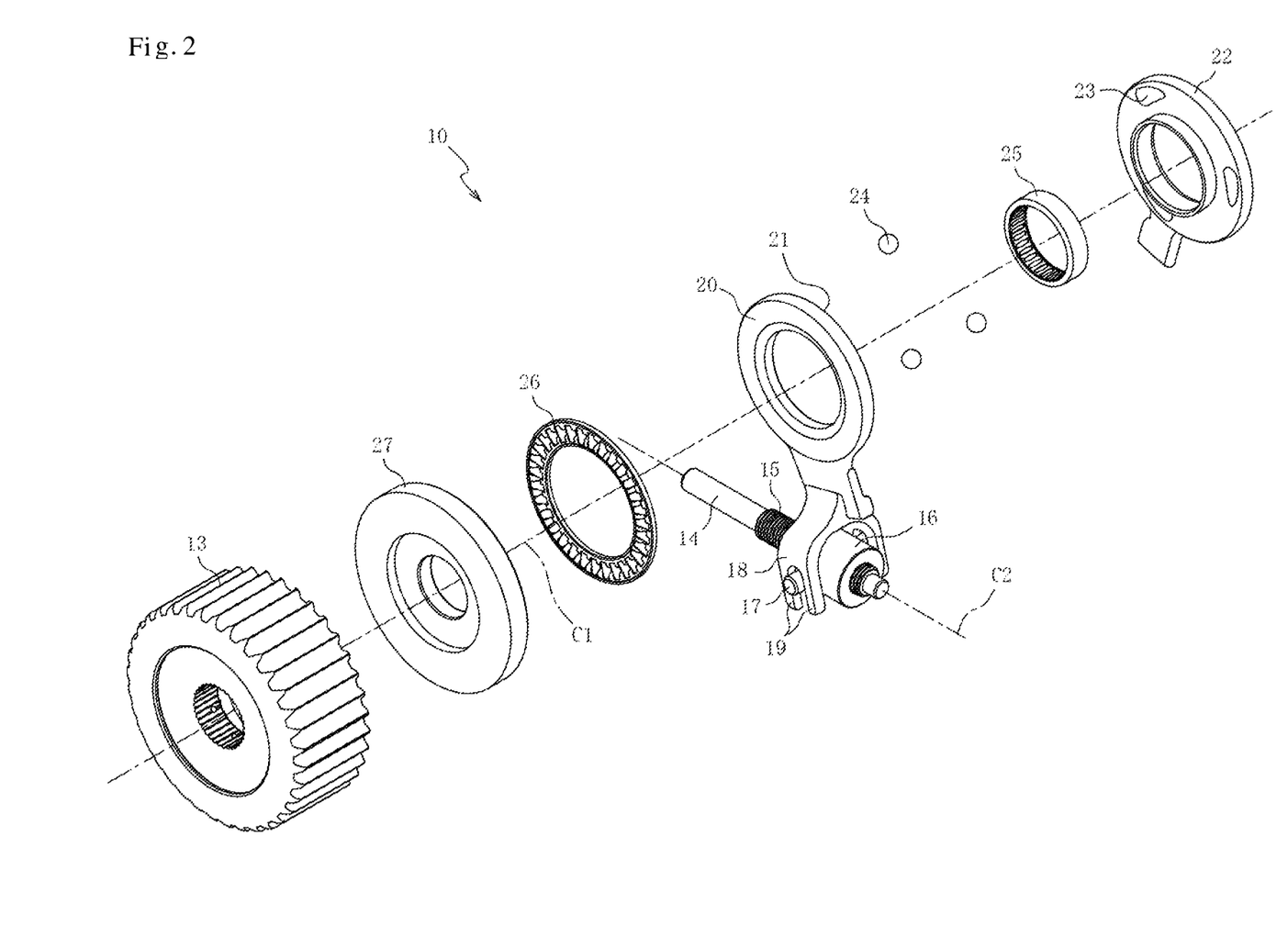
FIG. 2 is an exploded view illustrating the transmission device.

FIG. 2 is an exploded view illustrating the transmission device 10. The drive shaft 11 and the driven shaft 12 are not depicted in FIG. 2. A bearing 25 is disposed between the second cam member 22 and the driven shaft 12. The bearing 25 is a radial bearing that rotatably supports the driven shaft 12 with respect to the second cam member 22. In the present embodiment, the second cam member 22 is controlled to regulate its rotary motion around the first axis C1 and linear motion along the first axis C1. The first cam member 20 is supported by the second cam member 22 so as to be able to rotate around the first axis C1 and reciprocate on the first axis C1.

Cam surfaces 21, 23 are respectively formed on the surfaces of the first and second cam members 20, 22 that oppose each other. The cam surfaces 21, 23 are positioned on the same circumference centered on the first axis C1 with a predetermined phase difference. A rolling member 24 is disposed between the cam surfaces 21, 23. In the present embodiment, the rolling member 24 is shaped like a ball. However, the rolling member 24 is not limited to such a shape. It is obvious that a roller may be adopted as the rolling member 24. A bearing 26 is disposed between the first cam member 20 and the pressure plate 27. The bearing 26 is a thrust bearing for receiving a force that is oriented in the direction of the first axis C1 and applied between the pressure plate 27 and the first cam member 20 rotating around the first axis C1.

The shaft member 14 is rotatably disposed in a case (not depicted) of the transmission device 10 by a bearing (not depicted) fastened to the case. An electric motor (not depicted) rotates the shaft member 14 around the second axis C2. The screw member 16 is a cylindrical member having a female thread (not depicted) formed on the inner circumferential surface of the screw member 16. The female thread on the inner circumferential surface of the screw member 16 meshes with the male thread 15 on the shaft member 14. The screw member 16 has first sections 17 that are protruded radially outward from the outer circumferential surface of the screw member 16. The first sections 17 are provided at two spots of the outer circumferential surface of the screw member 16 that are positioned so as to sandwich the second axis C2. In the present embodiment, the first sections 17 are columnar in shape and extended in parallel with the first axis C1.

The arm 18 is a member shaped like a curved plate and disposed between the screw member 16 and the first cam member 20. The arm 18 couples to the first cam member 20, but is disposed at a predetermined distance from the screw member 16. The arm 18 has second sections 19 that come into contact with the first sections 17 of the screw member 16.

In the present embodiment, the second sections 19 are two prism-shaped protrusions that are positioned at both ends of the direction of the first axis C1, provided with respect to each of the first sections 17, and respectively brought into contact with the outer circumferential surfaces of the first sections 17. The second sections 19 are disposed at a predetermined distance from the outer circumferential surface of the screw member 16. The second sections 19 are pressed against the first sections 17 by at least either one of the pressing reaction force of the friction clutch 13 and the reaction force of a spring (not depicted). This makes it possible to inhibit abnormal noise from being generated when the second sections 19 collide with the first sections 17 due to vibration applied to the transmission device 10.

Figure 3:
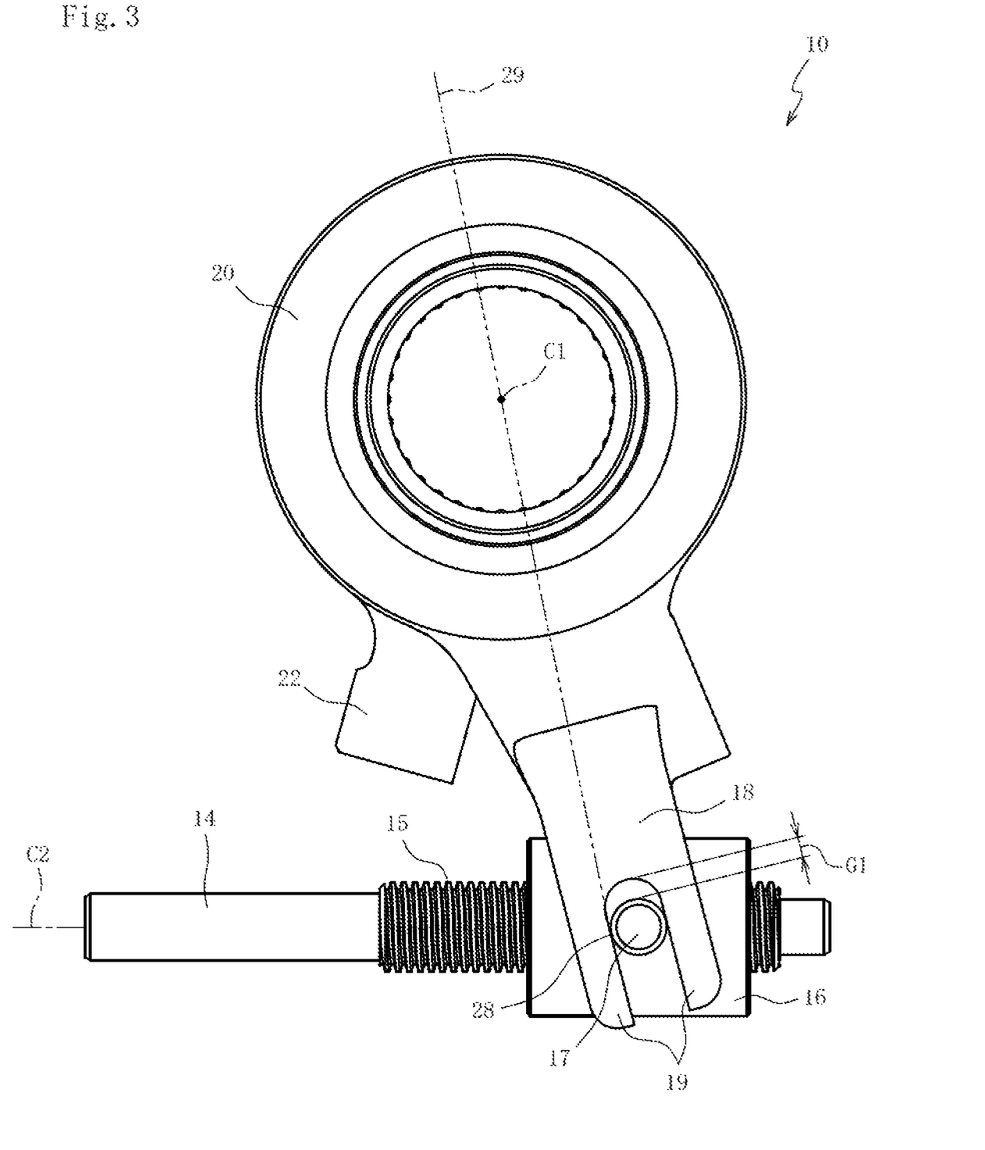
FIG. 3 is a front view illustrating the transmission device that is placed in a state where a friction clutch is disengaged.
Figure 4:
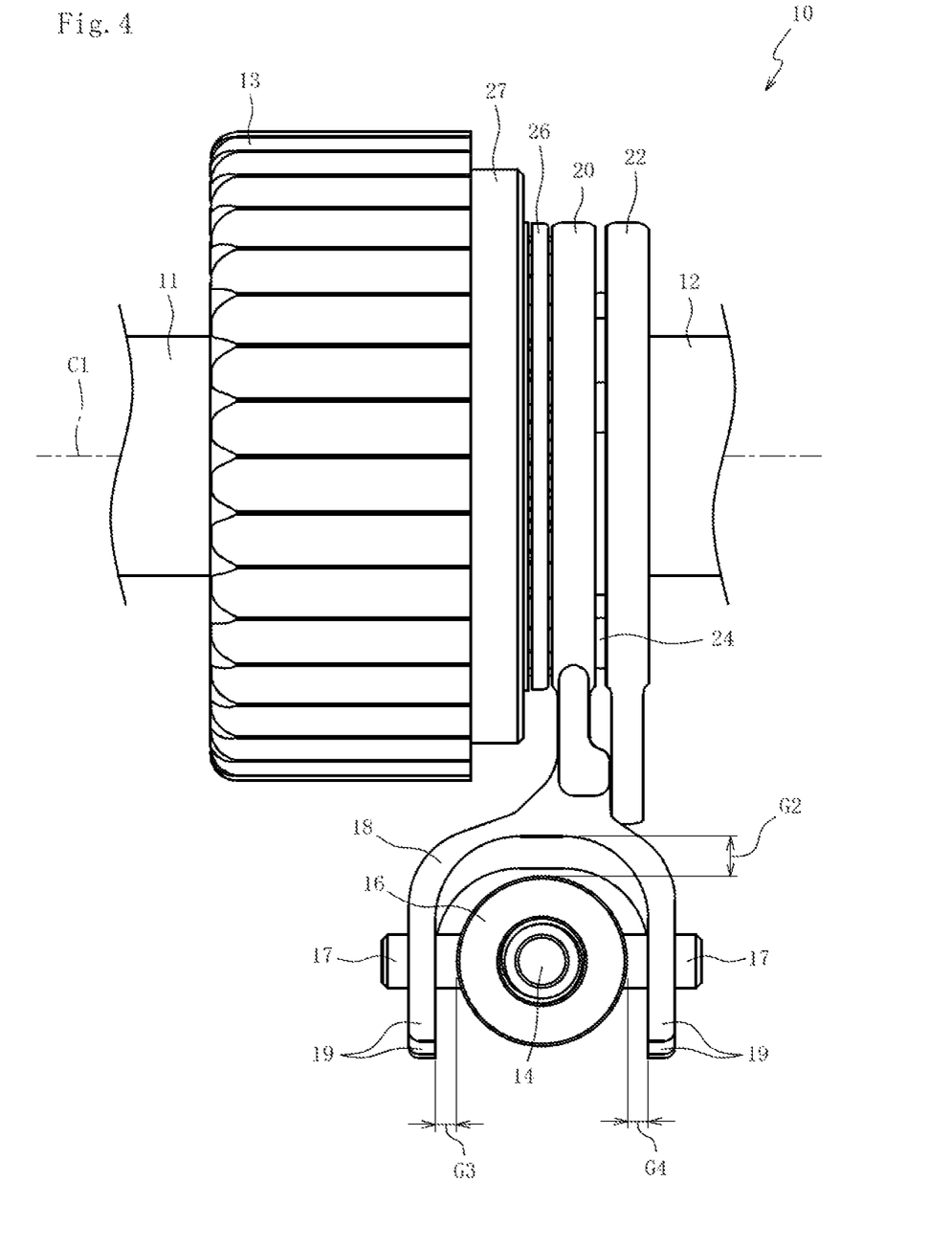
FIG. 4 is a side view illustrating the transmission device that is placed in a state where the friction clutch is disengaged.
Figure 5:
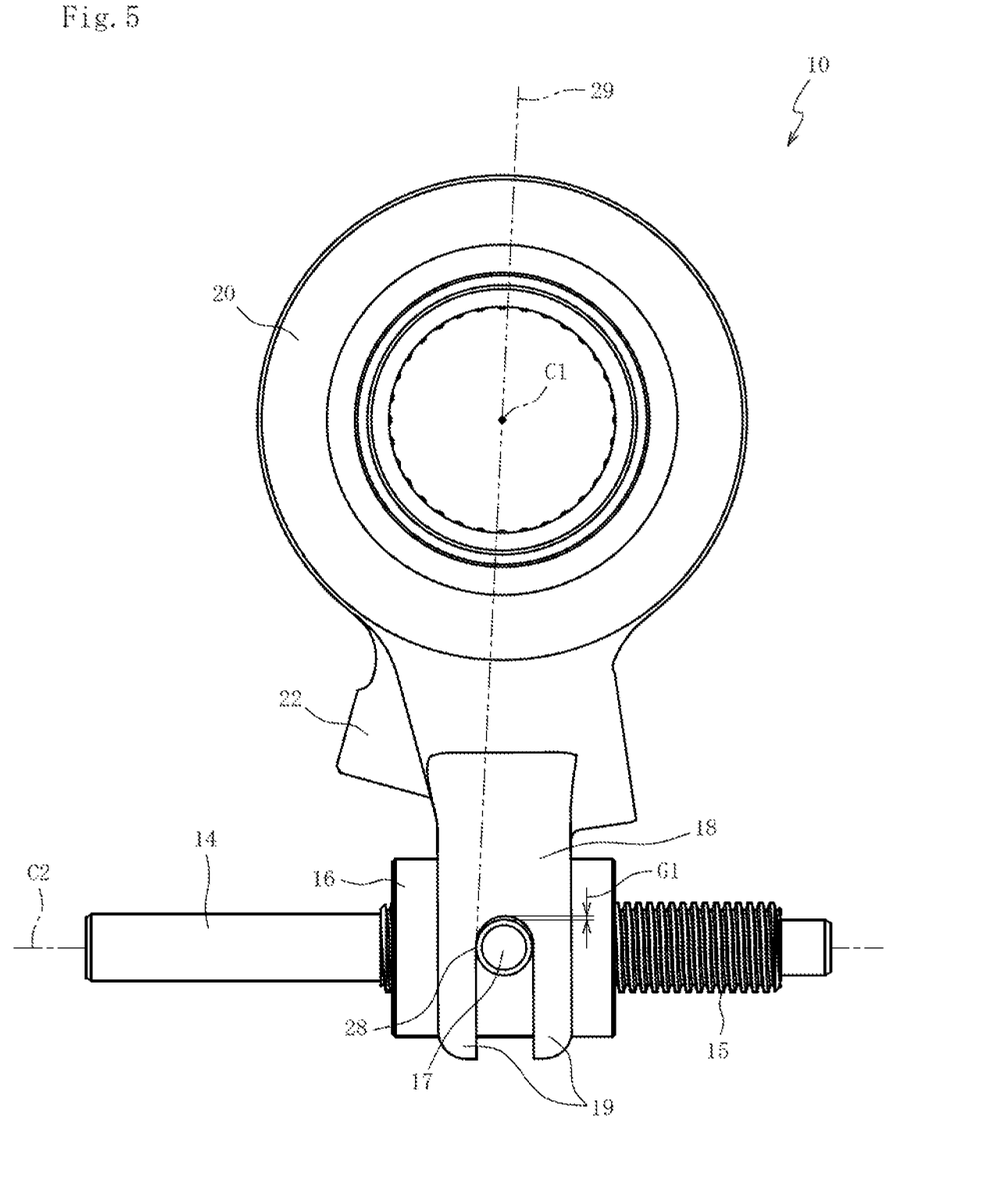
FIG. 5 is a front view illustrating the transmission device that is placed in a state where the friction clutch is engaged.
Figure 6:
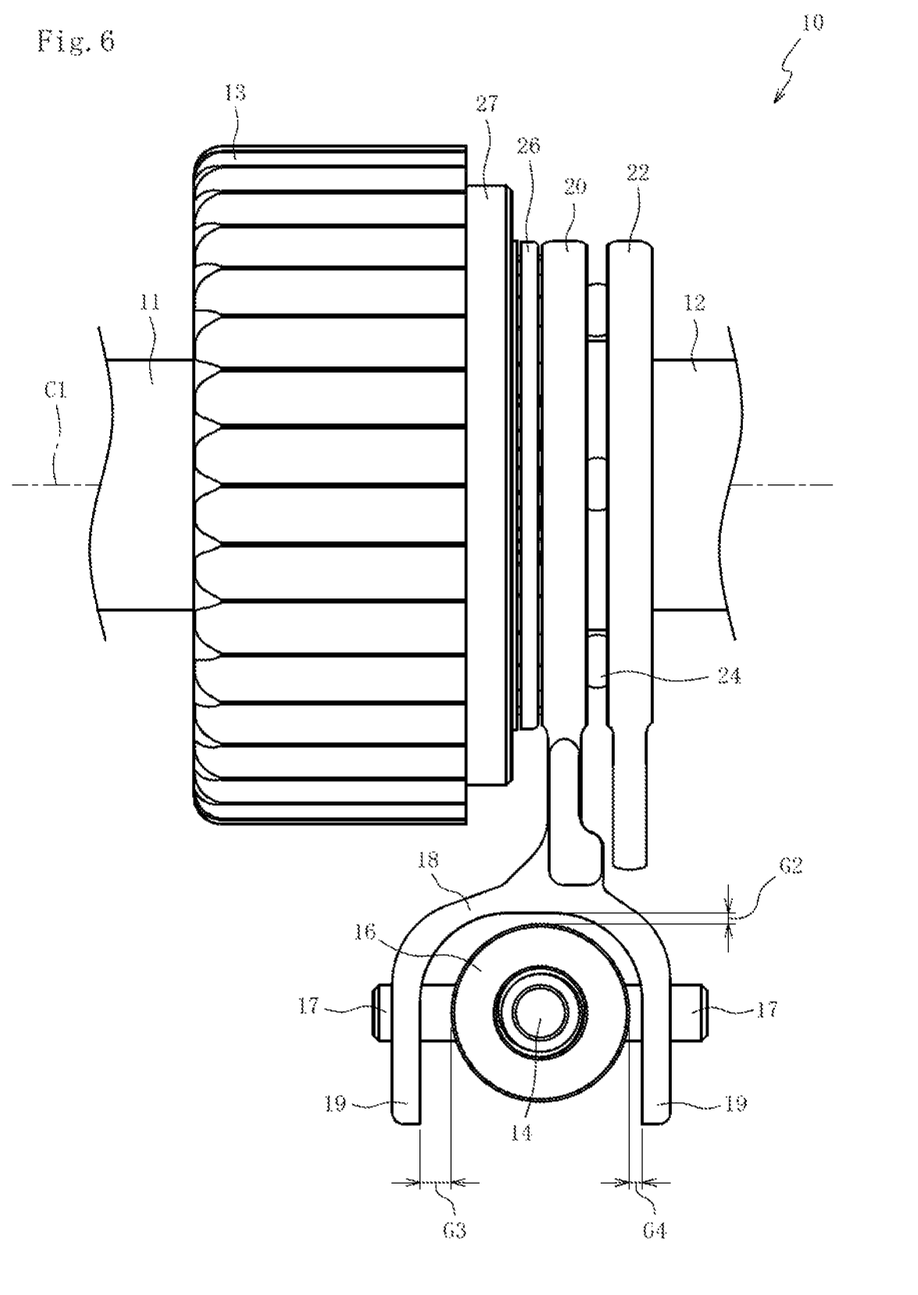
FIG. 6 is a side view illustrating the transmission device that is placed in a state where the friction clutch is engaged.

FIG. 3 is a front view illustrating the transmission device 10 that is placed in a state where the friction clutch 13 is disengaged. FIG. 4 is a side view illustrating the transmission device 10 that is placed in such a state. FIG. 5 is a front view illustrating the transmission device 10 that is placed in a state where the friction clutch 13 is completely engaged. FIG. 6 is a side view illustrating the transmission device 10 that is placed in such a state. The drive shaft 11, the driven shaft 12, the friction clutch 13, the pressure plate 27, and the bearing 26 are not depicted in FIGS. 3 and 5. In the present embodiment, the friction clutch 13 is engaged (see FIG. 5)

when the shaft member 14 rotates to move the screw member 16 to the left side of the second axis C2 (see FIG. 3), and is disengaged (see FIG. 3) when the shaft member 14 rotates to move the screw member 16 to the right side of the second axis C2 (see FIG. 5).

The shaft member 14 rotates in order to engage the friction clutch 13 as depicted in FIG. 5 while it is disengaged as depicted in FIG. 3. When the shaft member 14 rotates, friction occurs between the male thread 15 on the shaft member 14 and the female thread on the screw member 16 so as to rotate the screw member 16 together with the shaft member 14 in the same direction as the direction in which the shaft member 14 rotates.

However, the second sections 19 of the arm 18 coupled to the first cam member 20 come into contact with the first sections 17 of the screw member 16 to regulate the rotation of the screw member 16. This causes the male thread 15 to move the screw member 16 to the left side of FIG. 3 along the second axis C2. The first sections 17 of the screw member 16 come into contact with the second sections 19 of the arm 18 at a contact position 28, and move the arm 18 to the left side of FIG. 3 along the second axis C2 in accordance with the rotation of the shaft member 14. The arm 18 is coupled to the first cam member 20. Therefore, the arm 18 rotates clockwise around the first axis C1 together with the first cam member 20.

When the screw member 16 moves to the left side of FIG. 3 along the second axis C2, the arm 18 and the first cam member 20 rotate around the first axis C1 with respect to the second cam member 22. The second cam member 22 is controlled to regulate its rotary motion around the first axis C1 and linear motion along the first axis C1. Therefore, the first cam member 20 is pressed by the rolling member 24, which rolls on the cam surfaces 21, 23. As a result, the first cam member 20 presses the pressure plate 27 against the friction clutch 13 through the bearing 26 (see FIG. 6). This engages the friction clutch 3.

As described above, the transmission device 10 is configured such that the arm 18, which reciprocates together with the screw member 16, couples to the first cam member 20, which rotates around the first axis C1, and thus regulates the rotation of the screw member 16 around the second axis C2. Therefore, when the shaft member 14 makes one rotation, the screw member 16 moves along the second axis C2 by the amount of lead of screw thread. As the first cam member 20 can be rotated by moving the screw member 16 depending on the lead angle of screw thread, an electric motor (not depicted) used for rotating the shaft member 14 does not need to have a large driving force even if the moment around the second axis C2 is small. As the distance between the first cam member 20 and the arm 18 can be shortened, it is possible to reduce the size (diameter) of the transmission device 10. Further, it is also possible to reduce the driving force required of the electric motor (not depicted) used for rotating the shaft member 14.

When the shaft member 14 rotates in a direction opposite to the direction in which the shaft member 14 rotates to engage the friction clutch 13, the arm 18 and the first cam member 20 rotate in the opposite direction and thus reduce the pressure applied by the pressure plate 27 to the friction clutch 13 (see FIG. 4). As a spring (not depicted) of the friction clutch 13 returns the pressure plate 27 to a previous position and thus releases the clutch plates, the friction clutch 13 becomes disengaged.

The position of the screw member 16 with respect to the shaft member 14 is fixed due to the friction of the threads between the shaft member 14 and the screw member 16.

Therefore, the screw member 16 can be stopped on the shaft member 14 without having to continuously drive the electric motor (not depicted). The electric motor needs to be driven only when the friction clutch 13 is to be engaged and disengaged. This makes it possible to reduce the amount of energy consumed by the electric motor.

A first gap G1 is provided between the first sections 17 of the screw member 16 and the arm 18 as depicted in FIG. 3. Further, a second gap G2 is provided between the outer circumferential surface of the screw member 16 and the arm 18 as depicted in FIG. 4. When the friction clutch 13 in a disengaged state is to be engaged, the contact position 28 between the first sections 17 and the second sections 19 passes on a virtual plane 29 passing through the contact position 28 and the first axis C1 in coordination with the rotary motion of the arm 18 and with the linear motion of the screw member 16, and moves in a direction toward the first axis C1. As a result, the gap G1 between the arm 18 and the first sections 17 gradually becomes small (see FIGS. 3 and 5). Similarly, the gap G2 between the arm 18 and the outer circumferential surface of the screw member 16 also becomes small (see FIGS. 4 and 6). As the gaps G1, G2 are provided between the screw member 16 and the arm 18, the linear motion of the screw member 16 along the second axis C2 can be easily converted to the rotary motion of the arm 18 around the first axis C1 without causing interference between the arm 18 and the screw member 16.

As depicted in FIG. 4, two gaps G3, G4 are provided in the direction of the first axis C1 between the second sections 19 of the arm 18, which couples to the first cam member 20, and the outer circumferential surface of the screw member 16. When the first cam member 20 subjects the friction clutch 13 to a force oriented in the direction of the first axis C1, the gap G4 becomes small, and the gap G3 becomes large (see FIGS. 4 and 6). Therefore, the rotary motion of the first cam member 20 around the first axis C1 can be certainly converted to the linear motion of the first cam member 20 along the first axis C1 without causing interference between the arm 18 and the screw member 16.

The length in the direction of the first axis C1 of a first section 17 of the screw member 16 that is near the friction clutch 13 is greater than the sum of the gap G3 near the friction clutch 13 and the thickness in the direction of the first axis C1 of the second sections 19. The length in the direction of the first axis C1 of a first section 17 far from the friction clutch 13 is greater than the sum of the gap G4 far from the friction clutch 13 and the thickness in the direction of the first axis C1 of the second sections 19. Therefore, the rotary motion of the first cam member 20 around the first axis C1 can be certainly converted to the linear motion of the first cam member 20 along the first axis C1 without separating the arm 18 from the first sections 17.

The transmission device 10 is configured such that the angle formed between the second axis C2 and the virtual plane 29 while the friction clutch 13 is completely engaged (see FIG. 5) is closer to 90 degrees than the angle formed between the second axis C2 and the virtual plane 29 while the friction clutch 13 is disengaged (see FIG. 3). Therefore, a force oriented in the direction of the second axis C2 is efficiently applied from the screw member 16 to the arm 18 and the first cam member 20 through the first sections 17 in order to engage the friction clutch 13. This enables the friction clutch 13 to generate a large pressing force. As a result, an electric motor (not depicted) used for rotating the shaft member 14 does not need to have a large driving force.

Figure 7:
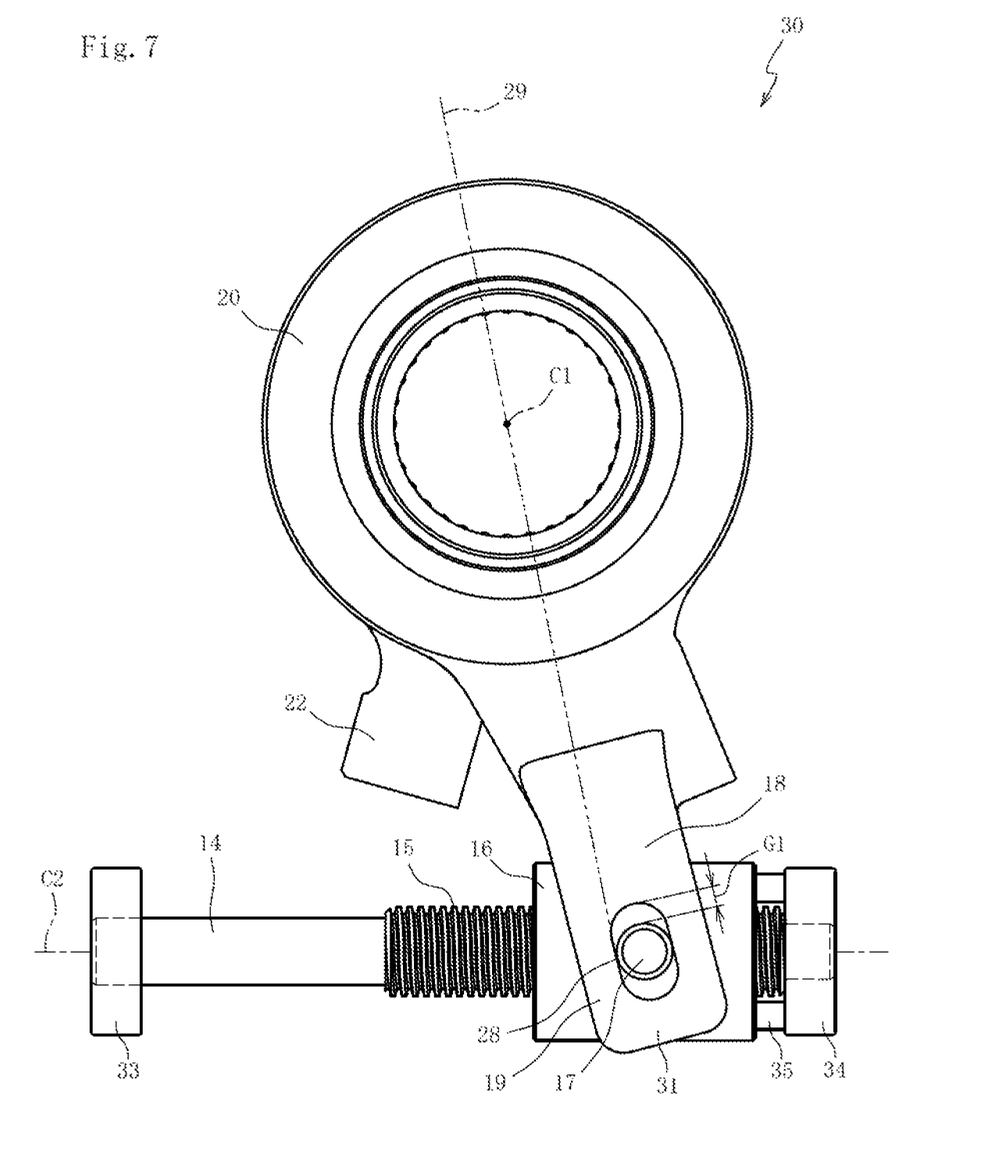
FIG. 7 is a front view illustrating the transmission device according to a second embodiment of the present invention that is placed in a state where the friction clutch is disengaged.

A second embodiment will now be described with reference to FIG. 7. A transmission device 30 is described below in conjunction with the second embodiment. The transmission device 30 is configured such that stoppers 31, 35 are respectively disposed on the screw member 16 and the arm 18. Elements identical with those described in conjunction with the first embodiment are designated by the same reference numerals as the corresponding elements in the first embodiment, and will not be redundantly described. FIG. 7 is a front view illustrating the transmission device 30 according to the second embodiment that is placed in a state where the friction clutch 13 is disengaged.

The transmission device 30 has the stopper 31, which connects the ends of the second sections 19 of the arm 18. The stopper 31 is flush with the second sections 19. Even if the screw member 16 is excessively torqued, the stopper 31 prevents an excessive rotation of the screw member 16 and thus keeps the first sections 17 from falling out of the space between the second sections 19. Therefore, the transmission device 30 can be made robust.

The transmission device 30 has the stopper 35, which is disposed on an end face of the screw member 16 that is positioned in the direction of the second axis C2. The ends of the shaft member 14 are supported by bearings 33, 34. The bearing 34 is closer to the male thread 15 than the bearing 33. The stopper 35 is positioned between the bearing 34 and the screw member 16. Even if the screw member 16 is excessively torqued while the friction clutch 13 is disengaged, the stopper 35 prevents the screw member 16 from excessively rotating and moving in an axial direction, and thus keeps the first sections 17 from falling out of the space between the second sections 19. Therefore, the transmission device 30 can be made robust.

A third embodiment will now be described with reference to FIGS. 8(a) and 8(b). The first and second embodiments have been described with reference to a case where the first sections 17 of the screw member 16 are protruded radially outward from the outer circumferential surface of the screw member 16 and moved into the space between the second sections 19 of the arm 18. Meanwhile, the third embodiment is described below with reference to a case where first sections 42 of a screw member 41 are concaved radially inward from the outer circumferential surface of the screw member 41, and second sections 44 provided for the arm 43 are moved into the first sections 42. It should be noted that elements identical with those described in conjunction with the first embodiment are designated by the same reference numerals as the corresponding elements in the first embodiment, and will not be redundantly described.

Figure 8A:
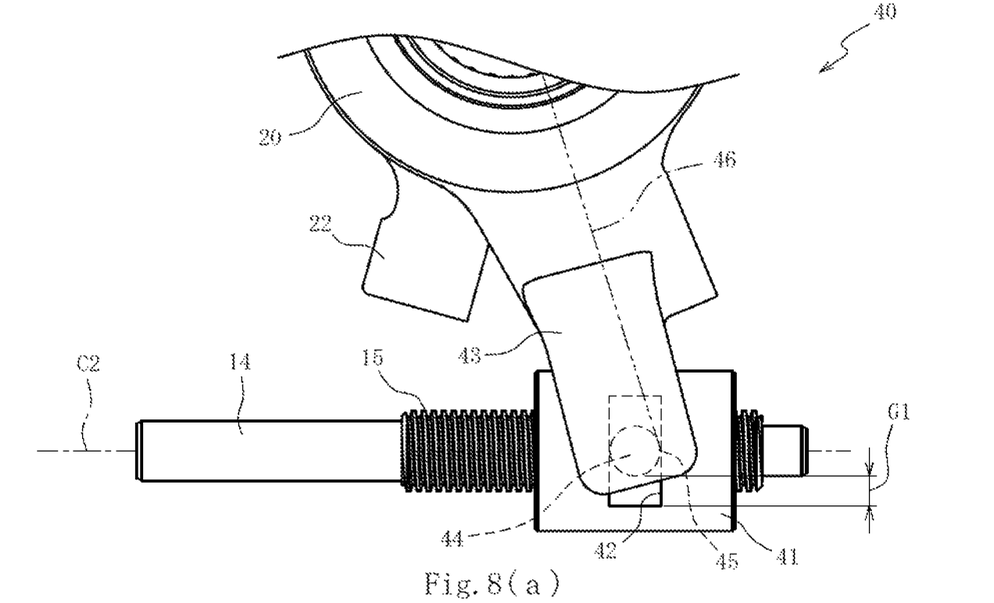
FIG. 8(a) is a front view illustrating the transmission device according to a third embodiment of the present invention that is placed in a state where the friction clutch is disengaged.

FIG. 8(a) is a front view illustrating a transmission device 40 according to the third embodiment that is placed in a state where the friction clutch 13 is disengaged. FIG. 8(b) is a side view illustrating the transmission device 40 that is placed in a state where the friction clutch 13 is completely engaged. FIGS. 8(a) and 8(b) do not depict the vicinity of the first axis C1.

Figure 8B:
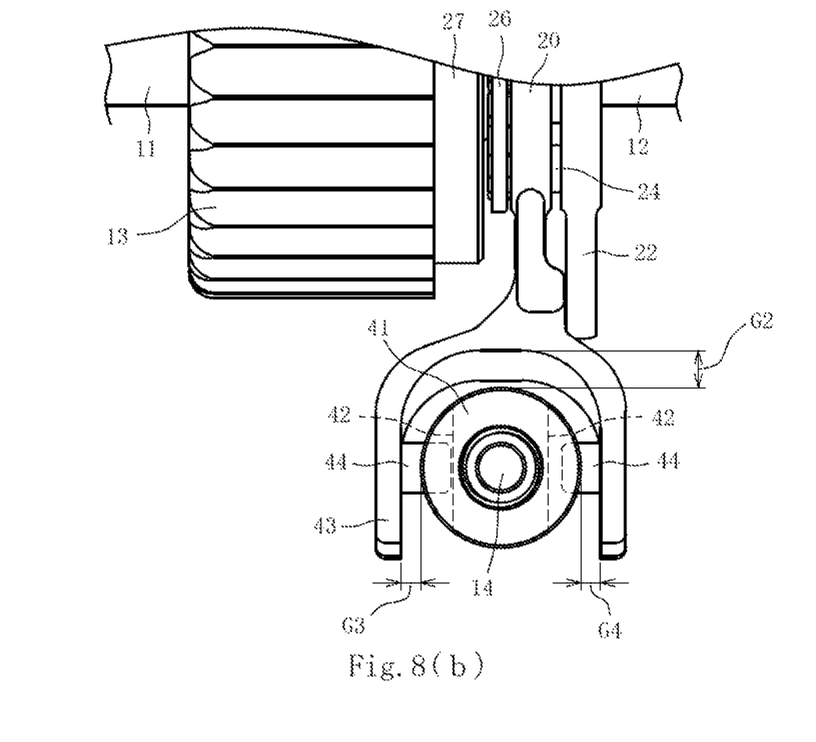
FIG. 8(b) is a side view illustrating the transmission device that is placed in a state where the friction clutch is engaged.

As depicted in FIGS. 8(a) and 8(b), the screw member 41 of the transmission device 40 has the first sections 42, which are concaved radially inward from the outer circumferential surface of the screw member 41. The first sections 42 are provided at two spots of the outer circumferential surface of the screw member 41 that are positioned so as to sandwich the second axis C2. In the present embodiment, the first sections 42 are grooves that are extended in the circumferential direction of the screw member 41 and perpendicularly to the second axis C2.

The arm 43 is a member shaped like a curved plate and disposed between the screw member 41 and the first cam member 20. The arm 43 couples to the first cam member 20. The inner surface of the arm 43 is positioned at a predetermined distance from the outer circumferential surface of the screw member 41. The arm 43 has the second sections 44, which respectively move into the first sections 42 (grooves). The second sections 44 are provided at two spots of the inner surface of the arm 43 that are positioned so as to sandwich the second axis C2. In the present embodiment, the second sections 44 are columnar in shape and extended in parallel with the first axis C1. The outer circumferential surfaces of the second sections 44 are in contact with the wall surface of the first sections 42 of the screw member 41, and a gap is provided between the tips of the second sections 44 and the groove bases of the first sections 42.

The depth in the direction of the first axis C1 of the first sections 41 of the screw member 41 and the length in the direction of the first axis C1 of the second sections 44 of the arm 43 are set so that the second sections 44 do not separate from the first sections 41 within the range of rotation of the arm 43 around the first axis C1.

In the present embodiment, too, rotating the shaft member 14 so as to move the screw member 41 to the left of the second axis C2 (see FIG. 8(a)) causes the friction clutch 13 to become engaged, and rotating the shaft member 14 in the opposite direction so as to move the screw member 41 to the right of the second axis C2 causes the friction clutch 13 to become disengaged.

As depicted in FIG. 8(a), a first gap G1 is provided between the ends of the first sections 42 of the screw member 41 and the second sections 44 of the arm 43. Further, as depicted in FIG. 8(b), a gap G2 is provided between the outer circumferential surface of the screw member 41 and the arm 43. When the friction clutch 13 in the disengaged state is to be engaged, a contact position 45 between the first sections 42 and the second sections 44 passes on a virtual plane 46 passing through the contact position 45 and the first axis C1 in coordination with the rotary motion of the arm 43 and with the linear motion of the screw member 41, and moves in a direction toward the first axis C1.

As a result, the gap G1 between the ends of the first sections 42 and the second sections 44 gradually becomes small (see FIG. 8(a)). Similarly, the gap G2 between the arm 43 and the outer circumferential surface of the screw member 41 also becomes small (see FIG. 8(b)). As the gaps G1, G2 are provided between the screw member 41 and the arm 43, the linear motion of the screw member 41 along the second axis C2 can be easily converted to the rotary motion of the arm 43 around the first axis C1.

Second gaps G3, G4 are provided in the direction of the first axis C1 between the inner surface of the arm 43, which couples to the first cam member 20, and the outer circumferential surface of the screw member 41 (see FIG. 8(b)). Allowing the first cam member 20 to subject the friction clutch 13 to a force oriented in the direction of the first axis C1 reduces the gap G4 and enlarges the gap G3. Similarly, allowing the first cam member 20 to subject the friction clutch 13 to the force oriented in the direction of the first axis C1 shortens the distance between the groove bases of the first sections 42 and the end of one of the two second sections 44, whichever is positioned far from the friction clutch 13. Therefore, the rotary motion of the first cam member 20 around the first axis C1 can be certainly converted to the linear motion of the first cam member 20 along the first axis C1.

The present invention has been described in terms of embodiments. However, the present invention is not limited to the foregoing embodiments. It will be easily understood by those skilled in the art that various improvements and modifications may be made without departing from the spirit and scope of the present invention. For example, the shapes of the screw members 16, 41, the shapes of the arms 18, 43, and the shape of the crest of the male thread 15 may be set as appropriate.

The foregoing embodiments have been described with reference to a case where the drum of the friction clutch 13 couples to the drive shaft 11 and the hub of the friction clutch 13 couples to the driven shaft 12. However, the present invention is not limited to such a configuration. Obviously, an alternative configuration may be adopted to couple the drum of the friction clutch 13 to the driven shaft 12 and couple the hub to the drive shaft 11. When such an alternative configuration is adopted, the first cam member 20 and the second cam member 22 are disposed around the drive shaft 11.

The foregoing embodiments have been described with reference to a case where the friction clutch 13 is a disc clutch having a disc-shaped engagement surface. However, the present invention is not limited to the use of such a friction clutch. It is obvious that a different friction clutch may be used. The different friction clutch may be, for example, a cone clutch. Further, the friction clutch 13 is not limited to a wet type. Obviously, a dry friction clutch 13 may also be used.

The first and second embodiments have been described with reference to a case where the first sections 17 of the screw member 16 are columnar in shape. Meanwhile, the third embodiment has been described with reference to a case where the second sections 44 of the arm 43 are columnar in shape. However, the present invention is not limited to such configurations. The shapes of the first sections 17 and the second sections 44 may be set as appropriate. Further, it is obvious that friction may be reduced by providing the first sections 17 and the second sections 44 with rollers (rolling bearings) and bringing the outer circumferential surfaces of the rollers into contact with the second sections 19 and the first sections 42. Furthermore, it is also obvious that a region brought into contact with the first sections 17 and the second sections 19 and a region brought into contact with the first sections 42 and the second sections 44 may be coated with a low-friction, abrasion-resistant material, such as diamond-like carbon, or provided with a low-friction, abrasion-resistant member.

The first and second embodiments have been described with reference to a case where the second sections 19 of the arm 18 are shaped like a prism. However, the present invention is not limited to such a configuration. The shape of the second sections 19 may be set as appropriate.

The foregoing embodiments have been described with reference to a case where the friction clutch 13, the first cam member 20, and the second cam member 22 are sequentially disposed on the first axis C1 in the order named so as to allow the first cam member 20 to linearly move along the first axis C1 while rotating around the first axis C1. However, the present invention is not limited to such a configuration. Obviously, an alternative structure may be adopted so as to sequentially dispose the friction clutch 13, the second cam member, and the first cam member on the first axis C1 in the order named, and move the second cam member along the first axis C1 in a direction away from the first cam member to press the pressure plate 27 when the first cam member rotates around the first axis C1 for engaging the friction clutch 13.

The second embodiment has been described with reference to a case where the stopper 31 is provided for the arm 18 while the stopper 35 is provided for the screw member 16. However, the present invention is not limited to such a configuration. It is obvious that one of the stoppers 31, 35 may be omitted. Further, it is obviously possible to provide the stopper 35 for the bearing 34 instead of providing the stopper 35 for the screw member 16.

The foregoing embodiments have been described with reference to a case where the angle formed between the second axis C2 and the virtual plane 29 while the friction clutch 13 is completely engaged (see FIG. 5) is closer to 90 degrees than the angle formed between the second axis C2 and the virtual plane 29 while the friction clutch 13 is disengaged (see FIG. 3). However, the present invention is not limited to such a configuration. For example, it is obvious that an angle of 90 degrees may be formed between the second axis C2 and the virtual plane 29 when the friction clutch 13 is in a slip state. That is to say, the angle formed between the second axis C2 and the virtual plane 29 when the friction clutch 13 becomes engaged may be set as appropriate.

DESCRIPTION OF REFERENCE NUMERALS 10, 30, 40: transmission device
13: friction clutch
14: shaft member
15: male thread
16, 41: screw member
17, 42: first section
18, 43: arm
19, 44: second section
20: first cam member
21: cam surface
22: second cam member
23: Cam surface
24: rolling member
28, 45: contact position
29, 46: virtual plane
C1: first axis
C2: second axis
G1: first gap
G2: second gap

The invention claimed is:
1. A transmission device that engages a friction clutch by subjecting the friction clutch to a force oriented in the direction of a first axis, the transmission device comprising:
a shaft member that has a male thread and rotates around a second axis, the second axis being perpendicular to the first axis, the male thread being formed on the outer circumferential surface of the shaft member and centered on the second axis;
a screw member that has a female thread meshing with the male thread;
an arm that reciprocates together with the screw member;
a first cam member that couples to the arm to regulate the movement of the screw member along the second axis, the first cam member being rotatable around the first axis;
a second cam member that has a cam surface oriented in the direction of the first axis to oppose a cam surface of the first cam member; and
a rolling member that is disposed between the two cam surfaces to roll on the two cam surfaces,
wherein either one of the first and second cam members subjects the friction clutch to a force oriented in the direction of the first axis,
wherein the screw member includes a first section, wherein the arm includes a second section that comes into contact with the first section to regulate the movement of the screw member, wherein, when the shaft member makes a rotary motion, a contact position between the second section and the first section moves on a virtual plane that passes through the contact position and the first axis, wherein an angle between the second axis and the virtual plane when the friction clutch is in an engaged state is closer to 90° than another angle between the second axis and the virtual plane when the friction clutch is in a disengaged state.

2. The transmission device according to claim 1, wherein, when the first cam member receives, from the friction clutch, a reaction force oriented in the direction of the first axis, the screw member regulates the rotation of the shaft member by using friction between the male thread and the female thread.

3. A transmission device that engages a friction clutch by subjecting the friction clutch to a force oriented in the direction of a first axis, the transmission device comprising:
- a shaft member that has a male thread and rotates around a second axis, the second axis being perpendicular to the first axis, the male thread being formed on the outer circumferential surface of the shaft member and centered on the second axis;
- a screw member that has a female thread meshing with the male thread;
- an arm that reciprocates together with the screw member;
- a first cam member that couples to the arm to regulate the movement of the screw member along the second axis, the first cam member being rotatable around the first axis;
- a second cam member that has a cam surface oriented in the direction of the first axis to oppose a cam surface of the first cam member; and
- a rolling member that is disposed between the two cam surfaces to roll on the two cam surfaces;

wherein either one of the first and second cam members subjects the friction clutch to a force oriented in the direction of the first axis, wherein the screw member includes a first section, wherein the arm includes a second section that comes into contact with the first section to regulate the movement of the screw member, wherein, when the shaft member makes a rotary motion, a contact position between the first section and the second section moves on a virtual plane that passes through the contact position and the first axis, and wherein a first gap is disposed between the screw member and the arm, the first gap changing in size as the shaft member rotates and the contact position moves on the virtual plane.

4. The transmission device according to claim 3, wherein the first gap is disposed between the first section and the second section along a direction of the movement of the contact position on the virtual plane.

5. The transmission device according to claim 3, wherein the first gap is a space between the screw member and the arm that is closest to the first cam member.

6. The transmission device according to claim 3, wherein, a second gap is disposed between the second section and the screw member in a direction of the first axis, and when a force in the direction of the first axis is applied to the friction clutch to engage the friction clutch, the second gap becomes smaller.

7. The transmission device according to claim 3, wherein the second section comes into contact with the first section at two locations across from each other on opposite sides of the second axis.

8. A transmission device that engages a friction clutch by subjecting the friction clutch to a force oriented in the direction of a first axis, the transmission device comprising:
- a shaft member that has a male thread and rotates around a second axis, the second axis being perpendicular to the first axis, the male thread being formed on the outer circumferential surface of the shaft member and centered on the second axis;
- a screw member that has a female thread meshing with the male thread;
- an arm that reciprocates together with the screw member;
- a first cam member that couples to the arm to regulate the movement of the screw member along the second axis, the first cam member being rotatable around the first axis;
- a second cam member that has a cam surface oriented in the direction of the first axis to oppose a cam surface of the first cam member; and
- a rolling member that is disposed between the two cam surfaces to roll on the two cam surfaces;

wherein the second cam member is controlled to regulate a rotary motion thereof around the first axis and a linear motion thereof along the first axis, wherein the first cam member subjects the friction clutch to a force oriented in the direction of the first axis, wherein second gaps oriented in the direction of the first axis are disposed between the screw member and the arm, and wherein allowing the first cam member to subject the friction clutch to the force oriented in the direction of the first axis reduces one of the second gaps, whichever is positioned farther from the friction clutch.

* * * * *